US011176314B2

(12) United States Patent
Mueller et al.

(10) Patent No.: US 11,176,314 B2
(45) Date of Patent: Nov. 16, 2021

(54) XML SCHEMA DESCRIPTION CODE GENERATOR

(71) Applicant: SAP SE, Walldorf (DE)

(72) Inventors: Kai Mueller, Walldorf (DE); Moritz Semler, Walldorf (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/575,531

(22) Filed: Sep. 19, 2019

(65) Prior Publication Data
US 2021/0089615 A1 Mar. 25, 2021

(51) Int. Cl.
*G06F 17/00* (2019.01)
*G06F 40/154* (2020.01)
*G06F 40/14* (2020.01)

(52) U.S. Cl.
CPC ............ *G06F 40/154* (2020.01); *G06F 40/14* (2020.01)

(58) Field of Classification Search
None
See application file for complete search history.

(56) References Cited

U.S. PATENT DOCUMENTS

| | | | |
|---|---|---|---|
| 2002/0073091 A1* | 6/2002 | Jain | G06F 9/465 |
| 2004/0189667 A1* | 9/2004 | Beda | G06T 11/20 345/619 |
| 2005/0071805 A1* | 3/2005 | Lauterbach | G06F 8/20 717/104 |
| 2005/0091068 A1* | 4/2005 | Ramamoorthy | H04L 41/0893 709/203 |
| 2005/0114394 A1* | 5/2005 | Kaipa | G06F 16/84 |
| 2005/0154978 A1* | 7/2005 | Albornoz | G06F 40/14 715/237 |
| 2005/0204022 A1* | 9/2005 | Johnston | H04L 41/0213 709/220 |
| 2005/0234924 A1* | 10/2005 | Betts | G06F 8/70 |
| 2005/0235275 A1* | 10/2005 | Betts | G06F 8/51 717/136 |
| 2009/0044101 A1* | 2/2009 | Vincent, III | G06F 8/51 715/234 |
| 2011/0184990 A1* | 7/2011 | Murphy | G06F 8/70 707/791 |
| 2014/0310320 A1* | 10/2014 | Chen | G06F 16/258 707/809 |
| 2016/0164953 A1* | 6/2016 | Hristov | H04W 4/60 709/203 |
| 2017/0262261 A1* | 9/2017 | Santiago | G06F 9/44521 |

OTHER PUBLICATIONS

Noodles, "Gettersand Setters", dated Jul. 19, 2018, pp. 1-11, URL<https://codegym.cc/groups/posts/13-getters-and-setters> (Year: 2018).*

* cited by examiner

*Primary Examiner* — Mustafa A Amin
(74) *Attorney, Agent, or Firm* — Mintz Levin Cohn Ferris Glovsky and Popeo, P.C.

(57) ABSTRACT

A method, a system, and a computer program product for generating code from an XML schema description. A source extendible markup language (XML) schema description for an object is received. Based on the received XML schema description, a XML schema description model having a plurality of model elements is computed. Each model element in the plurality of model elements corresponds to an element in the XML schema description for the object. Based on the computed XML schema description model, a computing code for implementation in a plurality of target computing environments is generated.

20 Claims, 8 Drawing Sheets

FIG. 3

| XSD element | XSDModel | OOModel | Java |
|---|---|---|---|
| all | XSDElementList | no counterpart | no counterpart |
| annotation | XSDAnnotation | not needed | not needed |
| any | XSDAny | no counterpart | Usage of predefined class |
| anyAttribute | XSDAnyAttribute | no counterpart | Usage of predefined class |
| appinfo | XSDAppinfo | not needed | not needed |
| attribute | XSDElement | Field | field |
| choice | XSDElementList | no counterpart | no counterpart |
| complexType | XSDComplexType | Class | Class |
| documentation | XSDDocumentation | DocumentationCapable | JavaDoc |
| element | XSDElement | Field | Field inside a class |
| key | XSDIdentityConstraint | no counterpart | Supported via XSD validation |
| keyref | XSDIdentityConstraint | no counterpart | Supported via XSD validation |
| list | XSDList | no counterpart | no counterpart |
| restriction | XSDRestriction | FieldRestrictions FieldValueRestrictions | Checks inside set/validate method |
| schema | XSDSchema | Package | package |
| selector | XSDIdentityConstraint | no counterpart | Supported via XSD validation |
| sequence | XSDElementList | no counterpart | no counterpart |
| simpleTyp | XSDSimpleType | Primitive Enum | XSD wrapper class enum |
| union | XSDUnion | no counterpart | not supported |
| unique | XSDIdentityConstraint | no counterpart | Supported via XSD validation |

302 304 306 308

300

XML SCHEMA DESCRIPTION CODE GENERATOR

TECHNICAL FIELD

This disclosure relates generally to data processing and, in particular, to an eXtensible Markup Language (XML) schema description (XSD) code generator.

BACKGROUND

Extensible Markup Language (XML) is a markup language that defines a set of rules for encoding documents in a format that is both human-readable and machine-readable. XML is a textual data format having support via Unicode for the languages of the world. XML can be used for the representation of arbitrary data structures and documents. Various application programming interfaces (APIs) exist to assist software developers with processing of XML data. Further, various schema systems exist to assist the developers in the definition of XML-based languages. Some of the document formats that use XML syntax include RSS, Atom, SOAP, XHTML, and others. However, conventional systems implementing XML/XML schema description do not allow effective or universal code generation for the purposes of using the code in APIs. Thus, there is a need for a way to effectively generate code based on XML schema description.

SUMMARY

In some implementations, the current subject matter relates to a computer implemented method for generating code from an XML schema description. The method may include receiving a source extendible markup language (XML) schema description for an object, computing, based on the received XML schema description, a XML schema description model having a plurality of model elements, wherein each model element in the plurality of model elements corresponds to an element in the XML schema description for the object, and generating, based on the computed XML schema description model, a computing code for implementation in a plurality of target computing environments.

In some implementations, the current subject matter can include one or more of the following optional features. The computing operation may further include generating a second model based on the computed XML schema description model. The second model may include a plurality of object-oriented elements generated from the model elements in the plurality of model elements using one or more object-oriented computing languages.

In some implementations, the method may also include generating one or more application programming interfaces for implementation in the plurality of target computing environments using at least one of the following: the XML schema description model, the second model, a model based on the XML schema description model, and any combination thereof. The second model (or OO model) can be one of the models that can be used for API generation. An API can also be generated using the XSD model and/or or any other model based on the XSD model. For example, for functional programming languages, a new model called functional programming model can exist and/or be generated based on the XSD model. Further, for another language, the API can be generated directly from the XSD model.

The method may also include at least one of the following: generating, using the generated computing code, one or more XML documents, reading one or more XML documents, loading one or more XML documents, generating one or more object trees based one or more XML documents, and any combination thereof. In some implementations, the method may also include generating, using the generated computing code, one or more calculation views.

In some implementations, the method may further include defining at least one of: one or more restrictions and one or more validation requirements. The first model may include the defined at least one of restrictions and validation requirements. The generated computing code may be executed in accordance with the defined at least one of restrictions and validation requirements. Further, the first model may include one or more classes, where each of the classes includes one or more builder classes that may encapsulate one or more setting methods having the defined restrictions and/or validation requirements configured to prevent alteration of generated computing code subsequent to the generating of the computing code.

In some implementations, the application programming interface can include at least one of the following: one or more predefined data types, one or more predefined classes, one or more data types wrapped in a predefined class, one or more mapped data types, one or more unmapped data types, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an exemplary table that shows conversion of some of the more frequently used elements in the XSD model to corresponding elements in the object-oriented model, according to some implementations of the current subject matter;

DETAILED DESCRIPTION

To address these and potentially other deficiencies of currently available solutions, one or more implementations of the current subject matter relate to methods, systems, articles of manufacture, and the like that can, among other possible advantages, provide an eXtensible Markup Language (XML) schema description (XSD) code generator.

In some implementations, the current subject matter may be configured to generate code, such as, an XML schema description code irrespective of the origin of the XML schema. To do so, the current subject matter may be configured to receive a source XML schema description (which may have been generated in any language) and generate, based on the received XSD, an XSD model. The XSD model may be generated such that each element, attribute, etc. of the received XSD is converted to a corresponding XSD element, XSD attribute, etc. The generated XSD model may then be converted into an object-oriented (OO) model, which may be built using any object-oriented language. The object-oriented model may then be used to generate an application programming interface (API) that may be used in any target computing environment.

Figure 1:
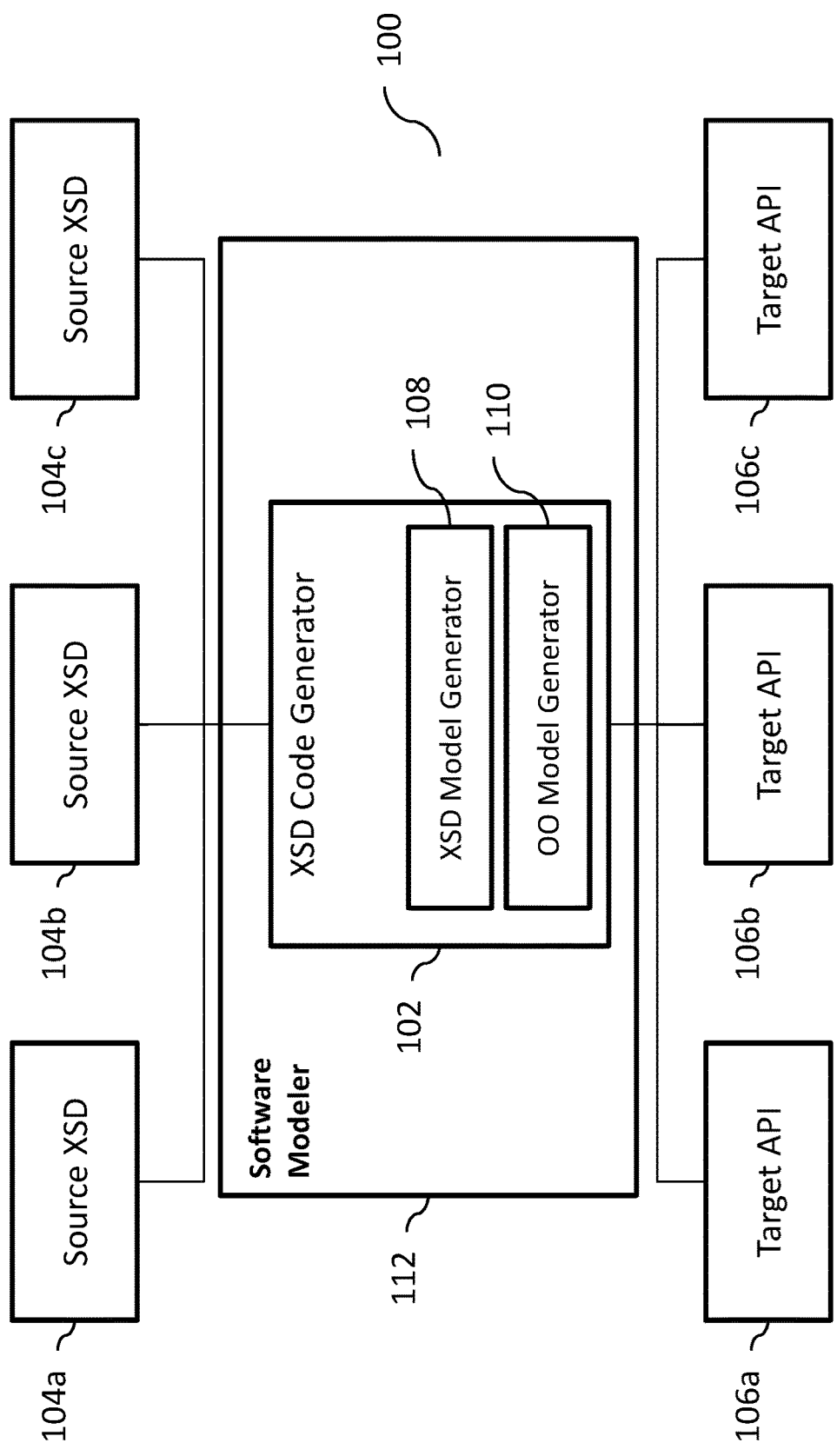
FIG. 1 illustrates an exemplary system for generating XML schema description code, according to some implementations of the current subject matter.

FIG. 1 illustrates an exemplary system 100 for generating XML schema description code, according to some implementations of the current subject matter. The system 100 may include one or more source XML schema description components 104 (a, b, c), an XSD code generating component 102, and one or more target API components 106 (a, b, c). The XSD code generating component 102 may include a XSD model generating component 108 and an object-oriented model generating component 110. Components 102-106 may be communicatively coupled using one or more communications networks. The communications networks may include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components 102-106 may include any combination of hardware and/or software. In some implementations, components 102-106 may be disposed on one or more computing devices, such as, server(s), database(s), personal computer(s), laptop(s), cellular telephone(s), smartphone(s), tablet computer(s), and/or any other computing devices and/or any combination thereof. In some implementations, the components 102-106 may be disposed on a single computing device and/or can be part of a single communications network. Alternatively, the components may be separately located from one another.

As shown in FIG. 1, source XSD components 104 may include various computing devices, servers, personal computers, databases, software applications, objects, functions, and/or any other types of devices and/or any combination thereof. The XSD components 104 may obtain various source XML schema descriptions (e.g., in different source computing languages) and provide it to the XSD code generating component 102 for generation of XSD code that may be used or plugged-in into any target API 106 (e.g., that may be in a different computing language). The component 102 may be configured to generate various instructions/commands to obtain source XSD from source XSD components 104. The instructions/commands may be in a form of a query, a function call, and/or any other type of instructions/commands. In some implementations, the instructions/commands may be provided using a keyboard, a mouse, a telephone, a smartphone, a tablet computer, a personal computer, a laptop computer, and/or using any other device. The component 102 may perform XSD code generation upon receiving an appropriate request, query, instruction, etc.

Any means may be used to obtain source XSD for the purposes of the XSD code generation performed by component 102, where the means may include one or more of the following: a keyboard, a mouse, a telephone, a smartphone, a tablet computer, a personal computer, a laptop computer, a server, and/or using any other device.

In some implementations, the system 100 may provide a way to generate code from XML schema description (XSD) documents in an extensible and secure manner. The generated code may include an application programming interface (API) to generate an XML document, which may be described by the XSD. The system 100 may also be configured to improve user experience and/or productivity of developers that may be using the current subject matter's XSD code generator.

In some implementations, the XSD code generator 102 may be implemented as part of an API for a software modeler program 112 (e.g., SAP's HANA product (as available from SAP SE, Walldorf, Germany), including its various views, e.g., calculation views. However, as can be understood, current subject matter's XSD code generator may be used by any XSD to generate a corresponding API. Calculation views may be stored in an XML format by the modeler program. To convert them to a database object, they may need to be activated. To do that, the modeler 112 may send the XML to the deployment program, which may be part of a calculation engine, which may then generate requisite metadata and a final calculation scenario (i.e., a database object).

In some implementations, as stated above, the XSD generator 102 may be configured to convert (or "abstract") the source XSD into a domain model (or XSD model) so that it may be used during code generation in a particular programming languages (e.g., language of a particular target API). The programming languages may be grouped in accordance with various specifications, patterns, etc., such as, object oriented or functional. Each group may have an optimized model based on the generated XSD domain model, i.e., the object-oriented model.

As part of the XSD code generation, the system 100 may be configured to perform at least one of the following operations: XML generation, XML loading, restrictions and validations, and code generation. XML generation is one of the functionalities of an application programming interface (API). For example, after a user creates a calculation view programmatically, the user may generate a corresponding XML with an optimal validation against an XSD used to generate that API, as will be further discussed below.

XSD may also define one or more restrictions or validation requirements. These, by way of a non-limiting example may include a length of a text, a maximum capacity for a list, etc. If these restrictions are not fulfilled, the XML might not be valid and may fail during activation, such as in the case of calculation views. By way of a further example, XSD may define minimum and maximum occurrences of an element in an XML document and/or other limitations. In conventional code generators, restrictions/validations may need to be triggered pro-actively with multiple lines of code, and hence, users may be creating invalid XML documents and only be notified during their activation. The current subject matter's code generator may generate a code that may include a "fail early" principle to allow detection of a problem as early as possible and provide an appropriate notification, such as, via an exception and/or dedicated return value, as discussed below. Thus, all checks based on the restrictions defined in the XSD may be checked in the setter and dedicated validation methods. In addition, the generated XML may be automatically validated by the XSD while the XML is being generated.

The API may also allow direct loading of a previously defined XML document, e.g., generated by the API and/or by another tool, e.g., a modeler. Depending on the conventional generator used, this feature may or may not be implemented. If implemented, it may require additional coding in conventional generators. The current subject matter's code generator may provide a single method call to load an XML document and receive a related object tree, as discussed below.

The current subject matter code generator may also allow code generation for a specific part of the object tree and/or all objects. This feature may be useful, if an XML document is loaded and transformations may need to be applied on code level and not on API level.

In some implementations, as part of the process for generating XSD code, the XSD code generator may be configured define a domain model that may have no dependencies. Once domain is defined, one or more use cases may be further defined on top of the domain model. These may include one or more interfaces that may be configured to interact with one or more external dependencies (e.g., objects, applications, APIs, etc.). These use cases may have one or more dependencies to the code of the defined domain as well as include references to other use cases. Further, one or more implementations of interfaces of external dependencies may also defined.

The defined domain model may define a core of the XSD code generator and may include one or more base classes. Further, the XSD code generator may also include a converter for conversion of the received XSD into an XSD model. A special interface, e.g., an converter-xsom interface, may be defined for implementations of the conversion of the XSD into an XSD model. The XSD code generator may also include a generator component that may generate code from the XSD model. The XSD code generator may also include an object-oriented code generator (e.g., generator-oo) that may be configured to generate code from an object-oriented model for use by object-oriented language. The object oriented code generator may define an object-oriented domain model and may be used to convert the XSD model into an OO model. For Java™ applications, the XSD code generator may also include a Java code generator, e.g., generator Java, which may be defined on top of the OO model. The XSD code generator may also include a one or more plugins (e.g., a generator-evoInflector plugin may be used for conversion of singular English words to plural).

In some implementations, the XSD model (that may be generated using an XSD model generator 108 shown in FIG. 1) may be defined as a domain model. It may be an object representation of XSD and may include some abstraction of elements.

Figure 2:
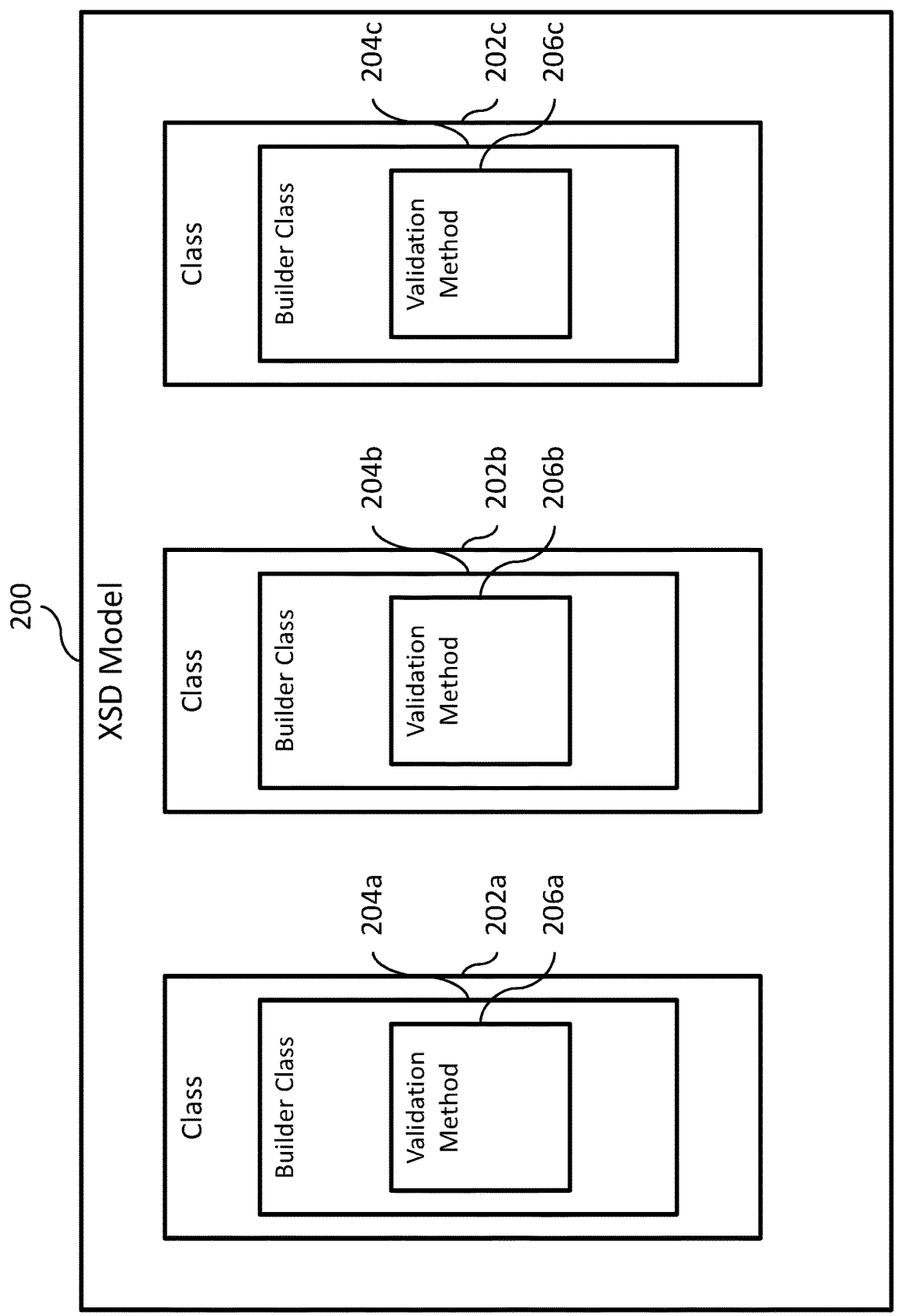
FIG. 2 illustrates an exemplary representation of an XSD model, according to some implementations of the current subject matter.

FIG. 2 illustrates an exemplary representation of an XSD model 200, according to some implementations of the current subject matter. The XSD model 200 may include one or more classes 202(a, b, c). Each class 202 may include a corresponding builder class 204(a, b, c). The builder class 204 may be implemented as an inner (or nested) static class. This is comparable to the simplified implementation of the builder pattern. The builder class 204 may encapsulate one or more setter methods into another class, so that any final objects may be immutable/unchangeable after build is completed. Moreover, the builder class 204 may include one or more corresponding validation methods 206(a, b, c), which may be overwritten by each implementation. This method may be called during the build and may perform one more validations (e.g., field is set). The following is a representation of the design of the builder class:

```
public class XSDType {
    private Integer count;
    private XSDType( ) { }
    public Integer getCount( ) {
        return count;
    }
    public static class XSDTypeBuilder {
        private XSDType object = new XSDType( );
        public void setCount(Integer count) {
            object.count = count; }
        public XSDType build( ) {
            validate( );
            XSDType temp = object;
            object = null;
            return temp;
        }
        private void validate( ) {
            if(count == null) {
                throw new NullPointerException( );
            }
        }
    }
}
```

Once the XSD model is generated by the XSD model generator 108, it may include all requisite information from an XSD source file (received source XSD component 104 shown in FIG. 1). The XSD model is then provided to the object-oriented (OO) model generator 110 that may optimize the XSD model for code generation for object-oriented languages, i.e., the generator 110 may convert the XSD model into an OO model. As a result of the conversion, each element of the XSD model may include a corresponding element in the OO element. FIG. 3 illustrates an exemplary table 300 that shows conversion of some of the more frequently used elements in the XSD model (column 302-304) to corresponding elements in the OO model (column 306). By comparison column 308 illustrates correlation with Java™ elements. As can be seen from the table 300, some XSD elements may be converted into fields (e.g., attribute—XSDElement), classes (e.g., complexType—XSDComplex- Type), fieldrestrictions/fieldvaluerestrictions, package, primitive/enum, etc. Other XSD elements in the XSD model might not have any counterparts and/or are not needed. Further, column 308 shows that more actions may be required for conversion purposes, if a conventional Java™ code generator is used.

Figure 4:
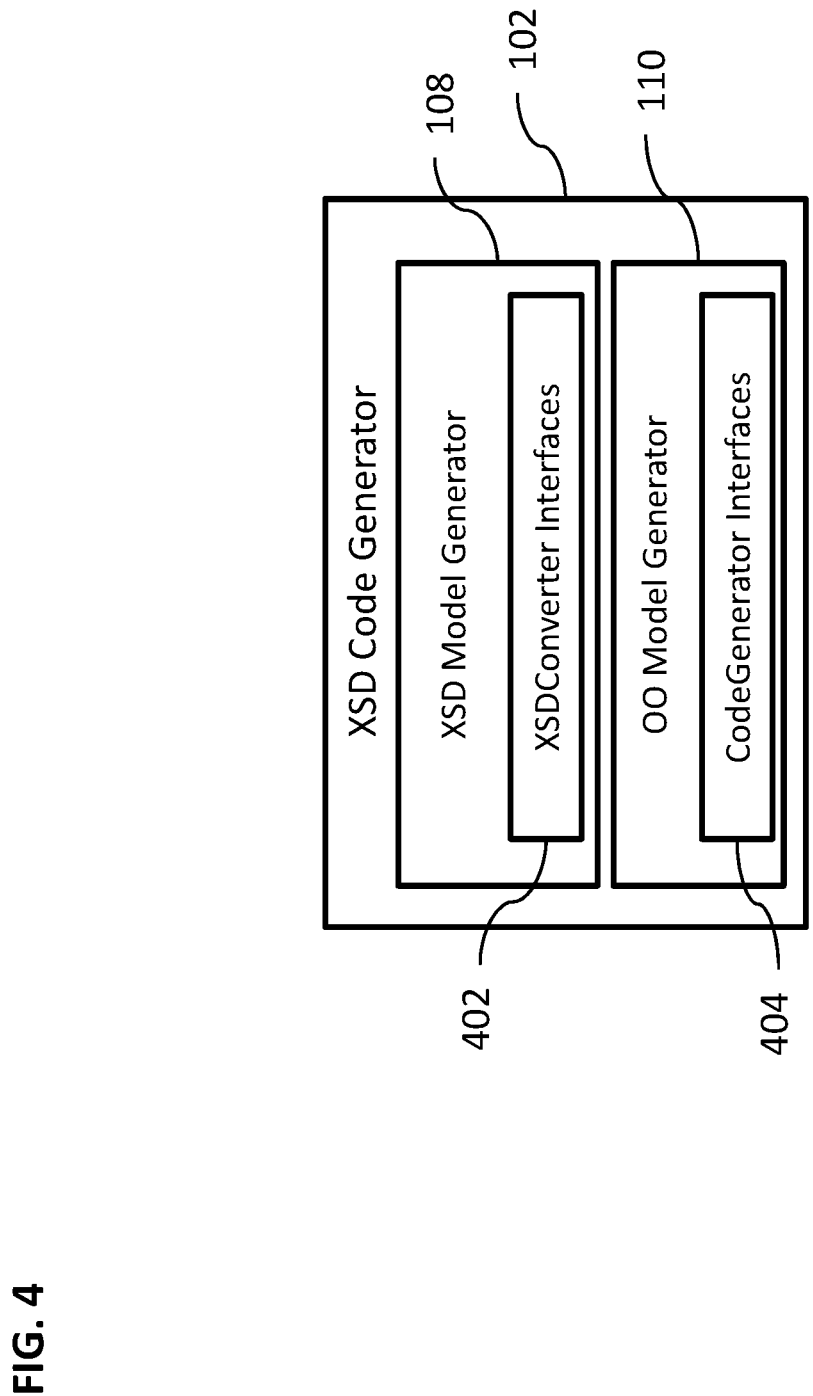
FIG. 4 illustrates an exemplary XSD code generator, according to some implementations of the current subject matter.

In some implementations, the generator 102 may define separate interfaces for the following conversions: conversation of XSD to the XSD model (i.e., XSDConverter interface) and conversion of XSD model to object-oriented code (i.e., CodeGenerator interface). In some implementations (e.g., to abstract the Java™ generation), a JavaCodeGenerator may be used to extend the OOCodeGenerator interface (i.e., object-oriented code generator interface) to convert the XSD model to the OO model. One or more implementations of the XSDConverter and CodeGenerator interfaces may be used for the purposes of conversion of XSD to the XSD model. As shown in FIG. 4, a user may select one or more of the XSDConverter interfaces 402 and then select one or more CodeGenerator interfaces 404 for the purposes of conversion. The selected XSDConverter interface 402 may be used to convert source XSD to an XSD model, and then the selected CodeGenerator interface 404 may be used to generate code based on the XSD model. To generate a Java™ code, for example, the source XSD may be parsed using Xsom functionality to generate an Xsom model. The Xsom model is then converted to the XSD model using the XSDConverter interface 402. The XSD model may then be converted into an object oriented model using an OOCodeGenerator interface (which may be part of the CodeGenerator interface 404), and then code may be generated from the OO model.

In some implementations, each XML instance document may have a root element. The root elements are may be defined as direct sub-nodes of a schema element. Each of the root elements may be converted to a root class. Each root class may have one field and may provide an interaction with an API. Further, build (to XML) and loading (from XML) methods may also defined with a XSD validation.

In addition to the root class, all generated classes may also include one or more of the following types: XMLType, XMLEnumType, XMLBaseType, XMLSimpleType, XMLClassType, and XMLRootClassType. The XMLType may be a base class of all predefined base classes and may defines all common methods in an abstract manner. The XMLEnumType may be a base type of generated enums (i.e., enumerations), which may be an interface. The XMLBaseType may be a base class used to enable the usage of wildcard elements. The XMLSimpleType may be a base class of all predefined XSD types. The XMLClassType may be a base class of all generated classes. The XMLRootClassType may refer to the root class. Each class may also define one or more methods to interact with a field. One or more of the following methods may be generated: get method (get the value(s) of a field), set/add method (set the value of a field or add a value), has method (check if the field is set or contains any value), unset/remove method (unset the field or removes one or all values). To interact with the class itself, one or more of the following methods may be defined: deepCopy, fromXML, toXML, and toCode.

In some implementations, referring back to FIG. 1, the code generator 102 may generate as little code as possible. Other code like util classes, tracing, predefined datatypes and the base classes may already be a part of the codebase of the generator. During the build, the code may be extracted so that the final assembly includes the source code of these classes. After the code generation these classes are loaded, modified and then moved to the output directory of the code generation.

Each type may have a fromXML (convert the type into a string, which can be used inside an XML document) and toXML (convert an XML text into the datatype in Java™) function. In addition to the conversion, each datatype may need to include encoding, decoding, whitespace handling and other defined aspects. To implement these requirements, each XSD datatype may be wrapped in its own class, e.g., Boolean into XSDBoolean, dateTime into GregorianDateTime. These classes may be predefined, so they are not generated but already written in source code and may be copied to the target code generation directory. As discussed above, some XSD types may have a counterpart in Java™. To avoid the instantiation of unnecessary wrapper classes, the current subject matter's code generator may define two types of primitive type: mapped (e.g., type with counterpart) and unmapped (e.g., no direct counterpart). Whenever the field type is of a mapped type the Java™ counterpart may be returned. For example, if a field of the XSD type Boolean, the set method generated for a class may be expressed as follows:

```
public void setFieldA(boolean fieldA) {
    XSDBoolean newFieldA = new XSDBoolean(fieldA);
    this.fieldA = new FieldA;
}
```

In this case, the field has the type XSDBoolean, but the input argument has the mapped type (Java™'s primitive type Boolean). In comparison, the set method for a date type may be expressed as follows:

```
public void setFieldA(GregorianDate fieldA) {
    this.fieldA = fieldA;
}
```

In some implementations, the XSD may define one or more restrictions which may be used to restrict possible values to a set for a certain field in an instance document. For example, the maximum or minimum value may be defined for a number or the maximum length for a text. The different restrictions might not be defined on any simple type because of a dependency on a type (atomic, union, list) and the used primitive type.

XSD restrictions may be definable for simple types, but other attributes may also serve as restrictions. For example, the minimum occurrence of an element or a model group may be comparable to the definition of the maximum length of a list.

In some implementations, the restrictions may be split into at least the following groups: field value restrictions and field restrictions. The field value restrictions may define valid values for a field and may be checked as a certain field value is set. The field restrictions may define restrictions on a field like the maximum capacity of a list. They may be checked during setting but may depend on a nature of the restriction after the field is converted to XML. In some implementations, each object-oriented field may have a method to obtain field value restrictions and the field restrictions. To check as much as possible before the object tree is converted to XML, the wrapper may implement a multi-layer validation process. At the outset, all wrapper classes for a primitive type may check their value in the constructor.

For example, a non-negative short cannot be negative. Then, in the set method, the maximum requirements of the field restrictions and all field value restrictions may be checked. In the build, all validation methods may be called. Lastly, the build method may, optionally, validate the generated XML against the XSD.

The code generator 102 may execute the multi-layer validation process by iterating over all model groups in a particular class. If the child is an element (on the top level it is always an attribute), a validation may be directly generated. Otherwise, the corresponding model group may be handled as follows:

```
main:
    FOREACH XSDComplexTypeChild IN XSDComplexType:
        IF XSDComplexTypeChild is XSDElement:
            GOTO createValidate
        ELSE
            GOTO handleXSDModelGroup
```

When handling a model group, it may be checked if the group is optional. This may be executed if one of the following is true: (1) the model group is inside a choice model group but not a choice itself, and (2) the model group is not a choice group, not inside a choice group, the group is optional and it has fields. If yes, the generated validation method may be checked if any field is set. To obtain all elements in a model group recursively, the model group may implement a special getFlatElementList method (hereinafter, referred to as "flat"). This may need to be performed if an element is mandatory (e.g., minOccurs=1) and the containing model is optional (minOccurs=0). The method may be expressed as follows:

```
handleXSDModelGroup:
    IF (XSDModelGroup is in a choice group AND XSDModelGroup is
    not CHOICE) OR
    (XSDModelGroup is in a choice group AND XSDModelGroup is not
    optional AND model group has fields):
        FOREACH element IN flat(XSDModelGroup):
            WRITE: IF element is set OR
```

If the model group is of a type choice, the model group is not optional and all elements in the model group may be mandatory, then the generated code may need to check if any field out the choices is set. This may be expressed as follows:

```
IF XSDModelGroup is choice AND XSDModelGroup is not optional
AND flat(XSDModelGroup) does not contain any optional element:
    FOREACH element IN flat(XSDModelGroup):
        WRITE: IF element is not set AND WRITE: throw error
```

The next action is to iterate through all elements in the model group. If the current model group is of a type choice, the validation may be wrapped inside a check, if the field is set. Then the validation of the element may be generated as follows:

```
FOREACH XSDElement IN XSDModelGroup:
    IF XSDModelGroup is choice:
        WRITE: IF element is set
        GOTO createValidate
    ELSE
        GOTO createValidate
```

Afterwards, each XSD model group defined as a child of the current model group may be handled as follows:

```
FOREACH XSDModelGroup IN XSDModelGroup:
    handleXSDModelGroup
```

As the last step, the code to check the element itself may be generated. This process may be split into two parts depending if the element occurred multiple times or only once. In the first case, the specified minimum length, length and maximum length may be checked in addition to the defined patterns. After that, the validation method on each element may be called. If the field occurred only once, it may be checked if the field is optional. If not and the field was not set, an error may be generated. The following code may be used:

```
createValidate:
    IF element is multiple:
        IF element has a minimum length:
            WRITE: check if list has the minimum length
        IF element has a length:
            WRITE: check if list has the length
        FOREACH pattern IN element:
            WRITE: check if list fulfills the pattern
        WRITE:
            FOREACH element IN list:
                validate element
    ELSE:
        IF element is not optional:
            WRITE: IF element is set throw error
        WRITE: validate element
```

In some implementations, if a simple type has enumeration restrictions defined, the type may be converted to the object-oriented model type Enum. Each enumeration value may be converted to an enumeration constant including the corresponding documentation. The argument type in the constructor may be the corresponding XSD primitive wrapper type. For example, the following generated code may be used:

```
<xs:simpleType name="letters">
    <xs:restriction base="xs:string">
        <xs:enumeration value="A"/>
        <xs:enumeration value="B"/>
        <xs:enumeration value="C"/>
    </xs:restriction>
</xs:simpleType>
public enum Letters {
    A(new XSDString("A")),
    B(new XSDString("B")),
    C(new XSDString("C"));
    private XSDString value;
    private Letters(XSDString value) {
        this.value = value;
    }
    public String toXMLText( ) {
        return value.toXMLText( );
    }
}
```

In some implementations, XSD may define a special model group—choice group. Only one element defined in the choice group may be used, e.g., either element A or element B or element C. To allow use of this group, the following code may be generated: (1) each element defined may have its own field including all corresponding methods; and (2) the set method may check if any other field out of this group is already set and if yes, an error is generated.

In some implementations, to convert an object into XML, each class may implement a method which converts the current instance into XML, may call the method on their super class and on all field values which are also classes. The root class may implement one or more additional methods which may be used by an end user: Build, which may generate a new XML document, invoke the toXML method on the instance and then convert the result to a string which contains the final XML document; and optionally, Build with validation, which may invoke the build method and validate the XML against the XSD. The toXML method may have one or more of the following input arguments: Document, i.e., an XML document which may be used to generate new element and attributes nodes; and Element, i.e., a current element on which the attributes and elements may be attached.

The XSD standard may define another namespace—XSI, which may be used to identify the subtype of a complex type. For example, if a field F has the type A and A is extended by B than B can also be used for F. However, it is not obvious if F is now of type A or B. To enable XML parsers to do so, the XML element may carry the xsi: type argument, which may refer to the XSD type name. This attribute may automatically be added in when a class with a super class is used.

XSD further may define three different model groups which can be order sensitive. To simplify this, the method which generated the XML may add the XML elements according to their definition (which may be order sensitive).

In some implementations, during XML loading, each class may implement a fromXML method, which may read data from the XML and convert it into Java™ runtime objects. Again, the xsi:type attribute may need to be checked. In the case it is set, the type defined may be instantiated, otherwise the current class if possible.

In some implementations, each object may generate the code to generate itself. As such, each class may define on or more of the following methods: Public toCode, which may be a method with no input arguments that may return the code to generate this object including other used objects; and Private toCode, which may be a method with two input arguments: the current variable name and the map to generate the names. The public method may return the code to generate this object and other used objects. The public method may be called by an end-user and the private method may be called by another toCode method. The input arguments of the private method are important, because a class may be used multiple times and thus may need multiple instantiations. Each instance may need a variable with a new name. The name map may include the class as the key and a counter as the value. If a new variable name is created, the class name may be concatenated with the corresponding incremented counter. By way of a non-limiting example, assume a user writes the following code:

```
Descriptions descriptions = new Descriptions( );
descriptions.setDefaultDescription("test");
CalculationScenario calculationScenario = new CalculationScenario( );
calculationScenario.setApplyPrivilegeType(PrivilegeType.NONE);
calculationScenario.setId(new Token("test"));
calculationScenario.setDescriptions(descriptions);
calculationScenario.toCode( );
```

The above code may return the following runnable Java™ code. The order of the method calls, and object creations might be different due a recursive implementation. The returned string may use full qualified class names:

```
bimodel.calculcation.CalculationScenario calculationScenario1 = new bimodel.calculation.CalculationScenario( );
calculationScenario1.setId(new core.Token("test"));
basemodel.base.Descriptions descriptions1 = new basemodel.base.Descriptions( );
descriptions1.setDefaultDescription("test");
calculationScenario1.setDescriptions(descriptions1);
calculationScenario1.setApplyPrivilegeType(basemodel.base.PrivilegeType.NONE);
```

In some implementations, if XSD model groups (all, choice and sequence) do not define minimum/maximum occurrences greater than 1, the groups may be ignored with respect to the occurrence of the included elements. The following shows a simplified example of the XSD model groups:

```
<xs:complexType name="ClassB">
    <xs:sequence>
        <xs:element name="element1" type="xs:string"
            maxOccurs="unbounded"/>
        <xs:element name="element2" type="xs:string"/>
    </xs:sequence>
</xs:complexType>
public class ClassA {
    private List<String> element1;
    private String element2;
}
```

When the groups define occurrences over 1, the order of the set calls may be important. However, it may be difficult to determine (in case "unbounded" parameter is used) when the set of the first occurrence of the group starts and when it ends. In the example below, it may be difficult to determine to which iteration the element of element1 may belong to:

```
<xs:complexType name="ClassB">
    <xs:sequence maxOccurs="unbounded">
        <xs:element name="element1" type="xs:string"
            maxOccurs="unbounded"/>
        <xs:element name="element2" type="xs:string"/>
        <xs:sequence maxOccurs="unbounded">
            <xs:element name="element3" type="xs:string"
                maxOccurs="unbounded"/>
        </xs:sequence>
    </xs:sequence>
</xs:complexType>
```

To avoid this, nested classes may be generated which wrap the model groups as follows:

```
public class ClassB {
    private List<ClassB1> classB1;
    public static class ClassB1 {
        private List<String> element1;
        private String element2;
        private List<ClassB11> classB11;
        public static class ClassB11 {
            private List<String> element3;
        }
    }
}
```

In some implementations, to allow users to easily clone objects without duplicate source code, each class may implement a copy method. This method may first generate a new object and then copy all values. In the case the value is a reference, it may also be copied (referred to as deep copy/deep clone). Since abstract classes cannot be instantiated, the subclasses may also copy their fields to their instance, which may lead to duplicate code. To avoid this, each class may have a second method which may use an object instance of their type as the input argument and then copy their field values to the instance. The public copy method may also refer to this method. An exemplary simple class with two fields may be generated as follows:

```
public class ClassA {
    private Object fieldA;
    private int fieldB;
    public ClassA deepCopy( ) {
        ClassA classA = new ClassA( );
        copyTo(classA);
        return classA;
    }
    protected void copyTo(ClassA classA) {
        classA.fieldA = fieldA.deepCopy( );
        classA.fieldB = fieldB;
    }
}
```

In case of an abstract parent class, the super method may need to be called as follows:

```
public class ClassA extends AbstractClassA {
    private Object fieldA;
    private int fieldB;
    public ClassA deepCopy( ) {
        ClassA classA = new ClassA( );
        copyTo(classA);
        return classA;
    }
    protected void copyTo(ClassA classA) {
        super.copyTo(classA);
        classA.fieldA = fieldA.deepCopy( );
        classA.fieldB = fieldB;
    }
}
public abstract class AbstractClassA {
    private Object fieldC;
    protected void copyTo(AbstractClassA abstractClassA) {
        classA.fieldC = fieldC.deepCopy( );
    }
}
```

In some implementations, the current subject matter may also support an XSD nillable attribute. For example, a class may define a field that is not set, where the field has a null value. It might not be possible to indicate, that it's explicitly set to null without use of a direct value, which might not be distinguishable from a normal value. To allow an explicit set of a nullable value, the following handling may be executed. If a field is marked as nillable, its type might not be defined, however, java.lang.Object may be the base class of all Java™ objects. If the field is normally used, the value might be casted. In case it should be set to null, the user may use the set method with a null as the input parameter. In the background, the field is not set to null but to a special instance of java.lang.Object. The following example illustrates this:

```
public class Holder {
    private static final Object NIL = new Object( );
    private ClassA classA;
    private Object classB; //nillable
    public void setClassA(ClassA classA) {
        this.classA = classA;
    }
    public void setClassB(ClassB classB) {
        if(classB == null) {
            this.classB = NIL;
        } else {
            this.classB = classB;
        }
    }
    public ClassA getClassA( ) {
        return classA;
    }
    public ClassB getClassB( ) {
```

-continued

```
        if(classB == NIL) {
            return null;
        }
        return (ClassB) classB;
    }
}
```

In some implementations, XSD may allow definition of wildcards and/or wildcard types. The wildcard elements may any and anyAttribute. The wildcard types may include anyType and anySimpleType. To use type wildcards, the corresponding field may set to the type XMLBaseType and may be filled with a defined type by the API or by a user-provided implementation. The wildcards may allow addition of more content and/or attributes to an element. The XSD may define restrictions. To enable usage, the generated class may include a synthetic field of type XMLBase Type.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 5:
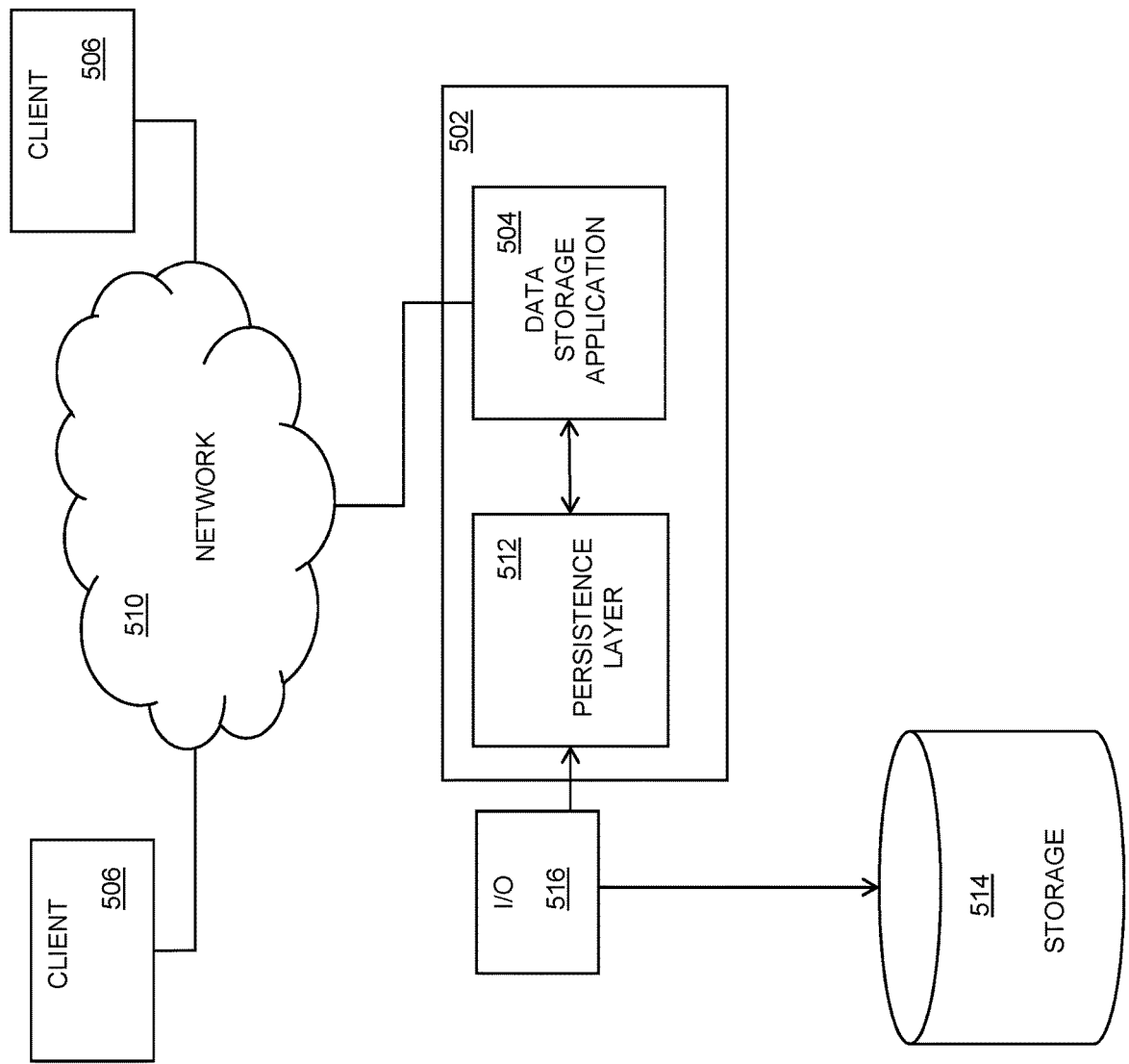
FIG. 5 is a diagram illustrating an exemplary system including a data storage application, according to some implementations of the current subject matter.

FIG. 5 illustrates an exemplary system 500 in which a computing system 502, which can include one or more programmable processors that can be collocated, linked over one or more networks, etc., executes one or more modules, software components, or the like of a data storage application 504, according to some implementations of the current subject matter. The data storage application 504 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 502 as well as to remote users accessing the computing system 502 from one or more client machines 506 over a network connection 510. One or more user interface screens produced by the one or more first modules can be displayed to a user, either via a local display or via a display associated with one of the client machines 506. Data units of the data storage application 504 can be transiently stored in a persistence layer 512 (e.g., a page buffer or other type of temporary persistency layer), which can write the data, in the form of storage pages, to one or more storages 514, for example via an input/output component 516. The one or more storages 514 can include one or more physical storage media or devices (e.g. hard disk drives, persistent flash memory, random access memory, optical media, magnetic media, and the like) configured for writing data for longer term storage. It should be noted that the storage 514 and the input/output component 516 can be included in the computing system 502 despite their being shown as external to the computing system 502 in FIG. 5.

Data retained at the longer term storage 514 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 6:
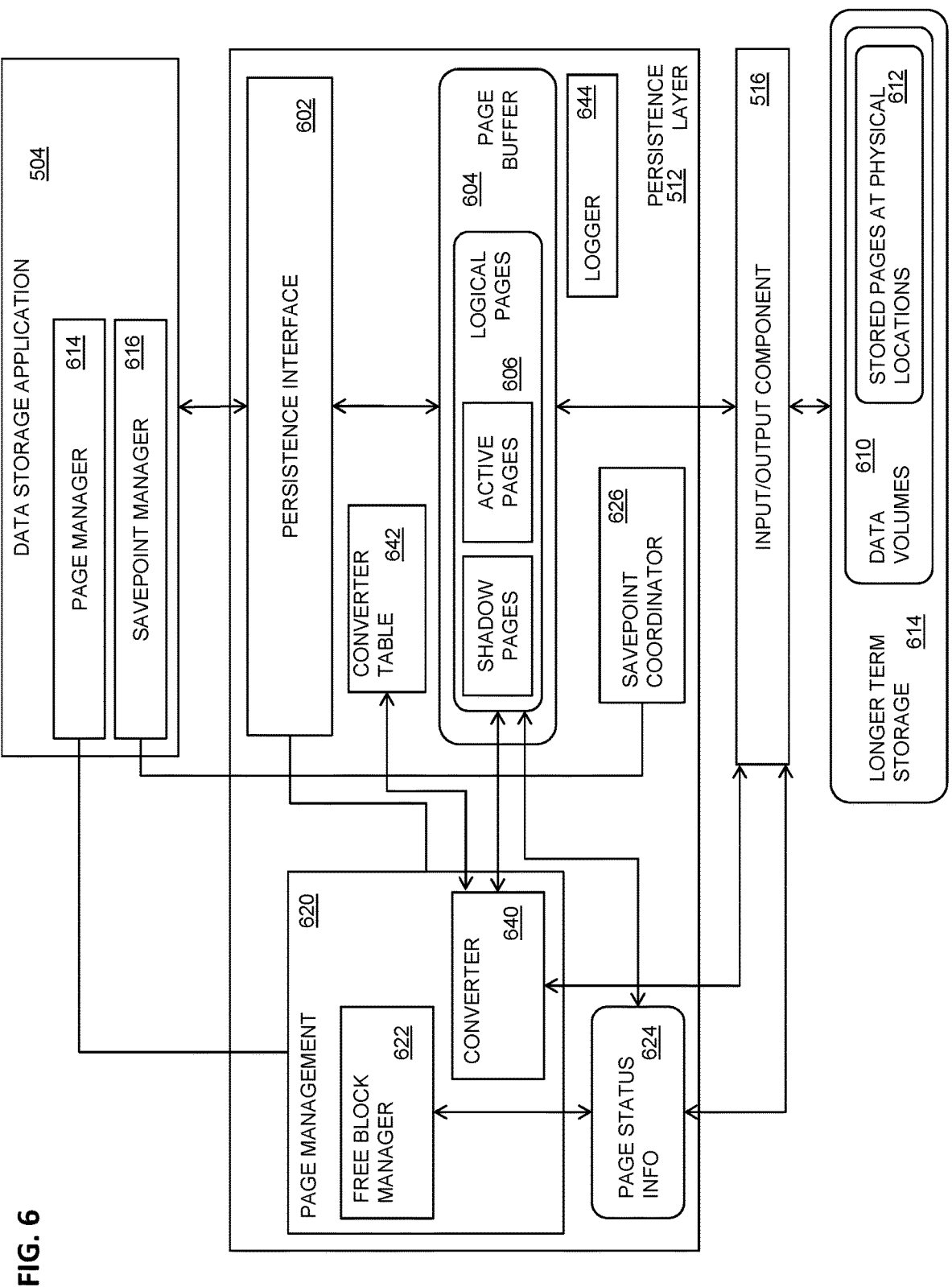
FIG. 6 is a diagram illustrating details of the system of FIG. 5.

FIG. 6 illustrates exemplary software architecture 600, according to some implementations of the current subject matter. A data storage application 504, which can be implemented in one or more of hardware and software, can include one or more of a database application, a network-attached storage system, or the like. According to at least some implementations of the current subject matter, such a data storage application 504 can include or otherwise interface with a persistence layer 512 or other type of memory buffer, for example via a persistence interface 602. A page buffer 604 within the persistence layer 512 can store one or more logical pages 606, and optionally can include shadow pages, active pages, and the like. The logical pages 606 retained in the persistence layer 512 can be written to a storage (e.g. a longer term storage, etc.) 514 via an input/output component 516, which can be a software module, a sub-system implemented in one or more of software and hardware, or the like. The storage 514 can include one or more data volumes 610 where stored pages 612 are allocated at physical memory blocks.

In some implementations, the data storage application 504 can include or be otherwise in communication with a page manager 614 and/or a savepoint manager 616. The page manager 614 can communicate with a page management module 620 at the persistence layer 512 that can include a free block manager 622 that monitors page status information 624, for example the status of physical pages within the storage 514 and logical pages in the persistence layer 512 (and optionally in the page buffer 604). The savepoint manager 616 can communicate with a savepoint coordinator 626 at the persistence layer 512 to handle savepoints, which are used to create a consistent persistent state of the database for restart after a possible crash.

In some implementations of a data storage application 504, the page management module of the persistence layer 512 can implement a shadow paging. The free block manager 622 within the page management module 620 can maintain the status of physical pages. The page buffer 604 can include a fixed page status buffer that operates as discussed herein. A converter component 640, which can be part of or in communication with the page management module 620, can be responsible for mapping between logical and physical pages written to the storage 514. The converter 640 can maintain the current mapping of logical pages to the corresponding physical pages in a converter table 642. The converter 640 can maintain a current mapping of logical pages 606 to the corresponding physical pages in one or more converter tables 642. When a logical page 606 is read from storage 514, the storage page to be loaded can be looked up from the one or more converter tables 642 using the converter 640. When a logical page is written to storage 514 the first time after a savepoint, a new free physical page is assigned to the logical page. The free block manager 622 marks the new physical page as "used" and the new mapping is stored in the one or more converter tables 642.

The persistence layer 512 can ensure that changes made in the data storage application 504 are durable and that the data storage application 504 can be restored to a most recent committed state after a restart. Writing data to the storage 514 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 644 can also be included to store the changes made to the data of the data storage application in a linear log. The logger component 644 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 644 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 512 can use a combination of undo log entries (from one or more logs) and shadow paging.

The persistence interface 602 can handle read and write requests of stores (e.g., in-memory stores, etc.). The persistence interface 602 can also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 644 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 644 can write a database log (or simply referred to herein as a "log") sequentially into a memory buffer in natural order (e.g., sequential order, etc.). If several physical hard disks/storage devices are used to store log data, several log partitions can be defined. Thereafter, the logger 644 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 504 can use shadow paging so that the savepoint manager 616 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 7:
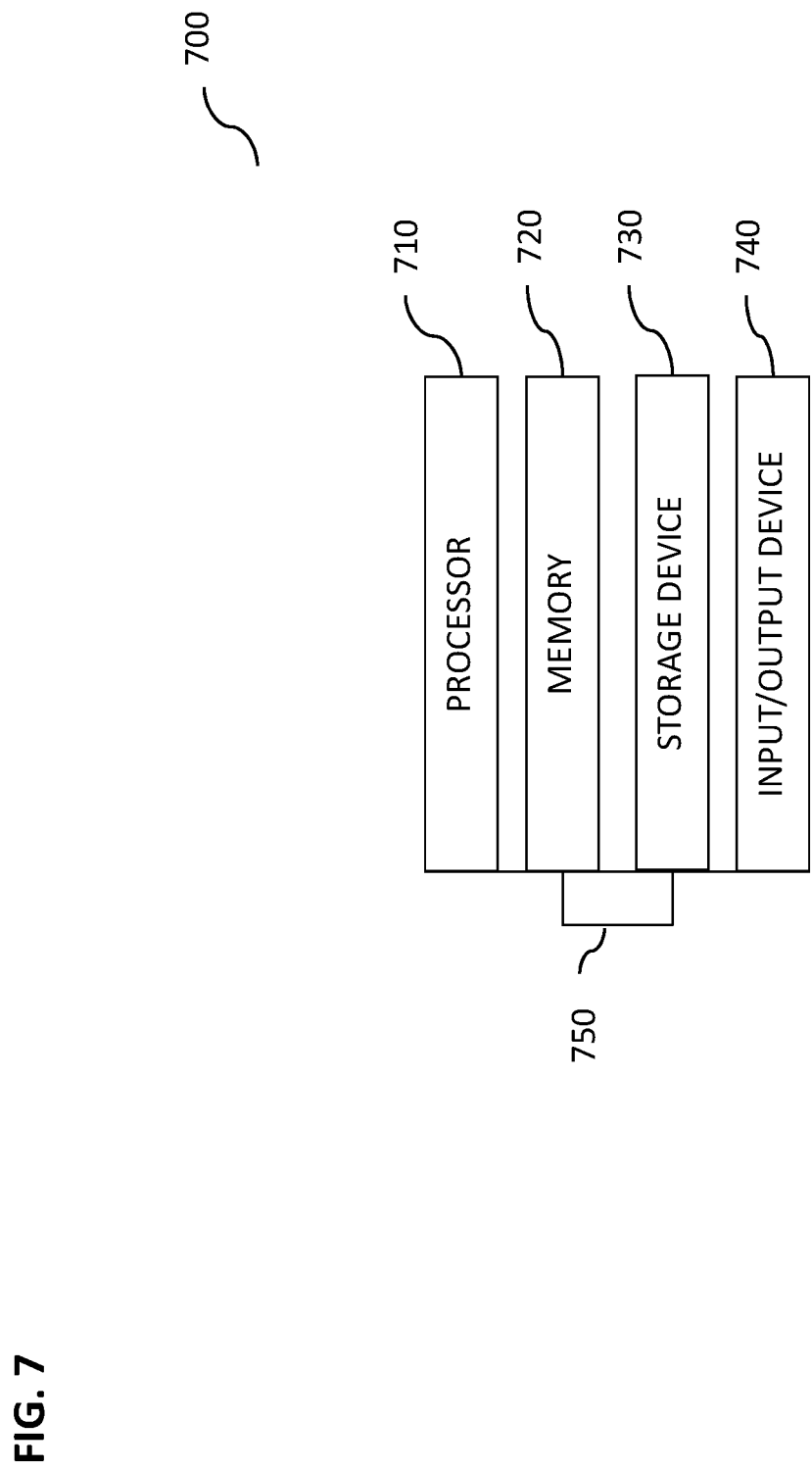
FIG. 7 is an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
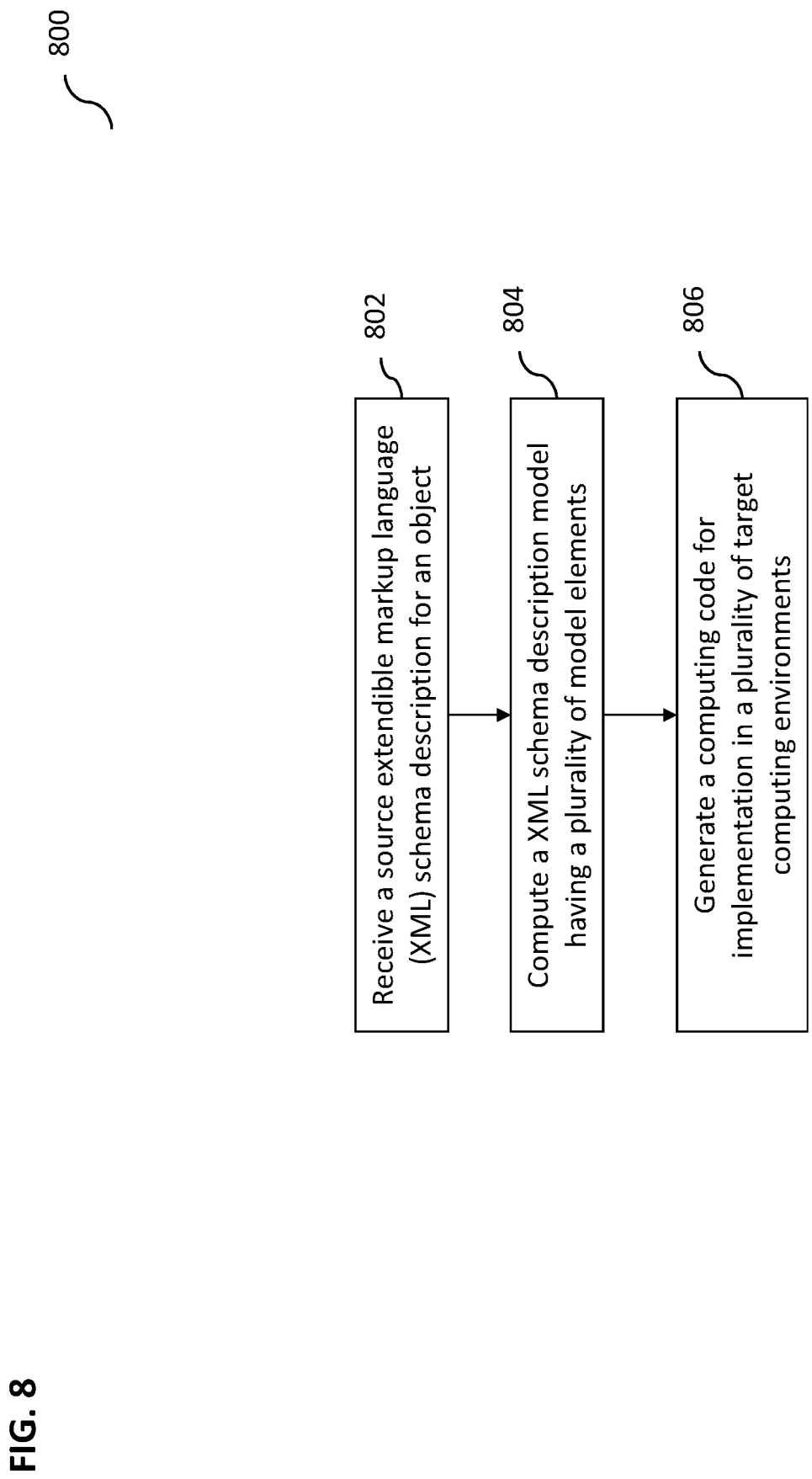
FIG. 8 is an exemplary method, according to some implementations of the current subject matter.

FIG. 8 illustrates an exemplary method 800 for generating code from an XSD, according to some implementations of the current subject matter. At 802, a source extendible markup language (XML) schema description may be received for an object. Based on the received XML schema description, a XML schema description model having a plurality of model elements may be computed (e.g., XSD may be converted into an XSD model using XSD model generator 108 shown in FIG. 1), at 804. In the computed mode, each model element in the plurality of model elements may correspond to an element in the XML schema description for the object. At 806, based on the computed XML schema description model, a computing code for implementation in a plurality of target computing environments may be generated (e.g., using generator 102 as shown in FIG. 1).

In some implementations, the current subject matter can include one or more of the following optional features. The computing operation may further include generating a second model based on the computed XML schema description model. The second model may include a plurality of object-oriented elements generated from the model elements in the plurality of model elements using one or more object-oriented computing languages.

In some implementations, the method may also include generating one or more application programming interfaces for implementation in the plurality of target computing environments using at least one of the following: the XML schema description model, the second model, a model based on the XML schema description model, and any combination thereof. The second model (or OO model) can be one of the models that can be used for API generation. An API can also be generated using the XSD model and/or or any other model based on the XSD model. For example, for functional programming languages, a new model called functional programming model can exist and/or be generated based on the XSD model. Further, for another language, the API can be generated directly from the XSD model.

The method may also include at least one of the following: generating, using the generated computing code, one or more XML documents, reading one or more XML documents, loading one or more XML documents, generating one or more object trees based one or more XML documents, and any combination thereof. In some implementations, the method may also include generating, using the generated computing code, one or more calculation views.

In some implementations, the method may further include defining at least one of: one or more restrictions and one or more validation requirements. The first model may include the defined at least one of restrictions and validation requirements. The generated computing code may be executed in accordance with the defined at least one of restrictions and validation requirements. Further, the first model may include one or more classes, where each of the classes includes one or more builder classes that may encapsulate one or more setting methods having the defined restrictions and/or validation requirements configured to prevent alteration of generated computing code subsequent to the generating of the computing code.

In some implementations, the application programming interface can include at least one of the following: one or more predefined data types, one or more predefined classes, one or more data types wrapped in a predefined class, one or more mapped data types, one or more unmapped data types, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a source extendible markup language (XML) schema description for an object;
   computing, based on the received XML schema description, a first XML schema description model having a plurality of model elements, wherein each model element in the plurality of model elements corresponds to an element in the XML schema description for the object, the first XML schema description model having a plurality of classes, each class in the plurality of classes having a XML schema description class type configured to be wrapped in a corresponding predetermined wrapper class, the corresponding predetermined wrapper class including at least one of the following: a wrapper class with a counterpart and a wrapper class without a counterpart, wherein one or more restrictions and one or more validation requirements are defined for the first XML schema description model, the one or more restrictions including one or more field value restrictions defining valid values for a field and one or more field restrictions defining restriction on the field, wherein each object-oriented field includes a method to retrieve the one or more field value restrictions and field restrictions during a set method; and
   generating, based on the computed first XML schema description model, a computing code for implementation in a plurality of target computing environments.

2. The method according to claim 1, wherein the computing further comprises generating a second model, based on the first computed XML schema description model, the second model including a plurality of object-oriented elements generated from the one or more model elements in the plurality of model elements using one or more object-oriented computing languages.

3. The method according to claim 2, further comprising generating one or more application programming interfaces for implementation in the plurality of target computing environments using at least one of the following: the first XML schema description model, the second model, a model based on the first XML schema description model, and any combination thereof.

4. The method according to claim 1, further comprising at least one of the following:
   generating, using the generated computing code, one or more XML documents;
   reading one or more XML documents;
   loading one or more XML documents;
   generating one or more object trees based one or more XML documents; and
   any combination thereof.

5. The method according to claim 1, further comprising generating, using the generated computing code, one or more calculation views.

6. The method according to claim 1, wherein the generated computing code is executed in accordance with the defined at least one or more restrictions and one or more validation requirements.

7. The method according to claim 6, wherein the first XML schema description model includes one or more classes, each of the one or more classes includes one or more builder classes encapsulating one or more setting methods having the defined at least one or more restrictions and one or more validation requirements configured to prevent alteration of the generated computing code subsequent to the generating of the computing code.

8. The method according to claim 3, wherein the application programming interface includes at least one of the following: one or more predefined data types, one or more predefined classes, one or more data types wrapped in a predefined class, one or more mapped data types, one or more unmapped data types, and any combination thereof.

9. A system comprising:
   at least one programmable processor; and
   a non-transitory machine-readable medium storing instructions that, when executed by the at least one programmable processor, cause the at least one programmable processor to perform operations comprising:
      receiving a source extendible markup language (XML) schema description for an object; computing, based on the received XML schema description, a first XML schema description model having a plurality of model elements, wherein each model element in the plurality of model elements corresponds to an element in the XML schema description for the object, the first XML schema description model having a plurality of classes, each class in the plurality of classes having a XML schema description class type configured to be wrapped in a corresponding predetermined wrapper class, the corresponding predetermined wrapper class including at least one of the following: a wrapper class with a counterpart and a wrapper class without a counterpart, wherein one or more restrictions and one or more validation requirements are defined for the first XML schema description model, the one or more restrictions including one or more field value restrictions defining valid values for a field and one or more field restrictions defining restriction on the field, wherein each object-oriented field includes a method to retrieve the one or more field value restrictions and field restrictions during a set method; and generating, based on the computed first XML schema description model, a computing code for implementation in a plurality of target computing environments.

10. The system according to claim 9, wherein the computing further comprises generating a second model, based on the computed first XML schema description model, the second model including a plurality of object-oriented elements generated from the one or more model elements in the plurality of model elements using one or more object-oriented computing languages.

11. The system according to claim 10, wherein the operations further comprise generating one or more application programming interfaces for implementation in the plurality of target computing environments using at least one of the following: the first XML schema description model, the second model, a model based on the first XML schema description model, and any combination thereof.

12. The system according to claim 9, wherein the operations further comprise at least one of the following:
   generating, using the generated computing code, one or more XML documents;
   reading one or more XML documents;
   loading one or more XML documents;
   generating one or more object trees based one or more XML documents; and
   any combination thereof.

13. The system according to claim 9, wherein the operations further comprise generating, using the generated computing code, one or more calculation views.

14. The system according to claim 9, wherein the generated computing code is executed in accordance with the defined at least one or more restrictions and one or more validation requirements.

15. The system according to claim 14, wherein the first XML schema description model includes one or more classes, each of the one or more classes includes one or more builder classes encapsulating one or more setting methods having the defined at least one or more restrictions and one or more validation requirements configured to prevent alteration of the generated computing code subsequent to the generating of the computing code.

16. The system according to claim 11, wherein the application programming interface includes at least one of the following: one or more predefined data types, one or more predefined classes, one or more data types wrapped in a predefined class, one or more mapped data types, one or more unmapped data types, and any combination thereof.

17. A computer program product comprising a non-transitory machine-readable medium storing instructions that, when executed by at least one programmable processor, cause the at least one programmable processor to perform operations comprising:
   receiving a source extendible markup language (XML) schema description for an object;
   computing, based on the received XML schema description, a first XML schema description model having a plurality of model elements, wherein each model element in the plurality of model elements corresponds to an element in the XML schema description for the object, the first XML schema description model having a plurality of classes, each class in the plurality of classes having a XML schema description class type configured to be wrapped in a corresponding predetermined wrapper class, the corresponding predetermined wrapper class including at least one of the following: a wrapper class with a counterpart and a wrapper class without a counterpart, wherein one or more restrictions and one or more validation requirements are defined for the first XML schema description model, the one or more restrictions including one or more field value restrictions defining valid values for a field and one or more field restrictions defining restriction on the field, wherein each object-oriented field includes a method to retrieve the one or more field value restrictions and field restrictions during a set method; and generating, based on the computed first XML schema description model, a computing code for implementation in a plurality of target computing environments.

18. The computer program product according to claim 17, wherein the computing further comprises generating a second model, based on the computed first XML schema description model, the second model including a plurality of object-oriented elements generated from the one or more model elements in the plurality of model elements using one or more object-oriented computing languages;
   wherein the operations further comprise generating one or more application programming interfaces for implementation in the plurality of target computing environments using at least one of the following: the first XML schema description model, the second model, a model based on the first XML schema description model, and any combination thereof, wherein the application programming interface includes at least one of the following: one or more predefined data types, one or more predefined classes, one or more data types wrapped in a predefined class, one or more mapped data types, one or more unmapped data types, and any combination thereof.

19. The computer program product according to claim 17, wherein the operations further comprise at least one of the following:
   generating, using the generated computing code, one or more XML documents;
   reading one or more XML documents;
   loading one or more XML documents;
   generating one or more object trees based one or more XML documents; and
   any combination thereof.

20. The computer program product according to claim 17, wherein the generated computing code is executed in accordance with the defined at least one or more restrictions and one or more validation requirements; wherein the first XML schema description model includes one or more classes, each of the one or more classes includes one or more builder classes encapsulating one or more setting methods having the defined at least one or more restrictions and one or more validation requirements configured to prevent alteration of the generated computing code subsequent to the generating of the computing code.

* * * * *